United States Patent [19]
Dehio

[11] Patent Number: 5,209,255
[45] Date of Patent: May 11, 1993

[54] ACCUMULATOR LOADING VALVE

[75] Inventor: Gottfried Dehio, Frankfurt am Main, Fed. Rep. of Germany

[73] Assignee: Alfred Teves GmbH, Frankfurt am Main, Fed. Rep. of Germany

[21] Appl. No.: 614,883

[22] Filed: Nov. 16, 1990

[30] Foreign Application Priority Data

Nov. 30, 1989 [DE] Fed. Rep. of Germany ....... 3939500

[51] Int. Cl.$^5$ ............................................. G05D 16/04
[52] U.S. Cl. ..................................... 137/115; 137/488
[58] Field of Search ............... 137/118, 116, 101, 115, 137/488; 251/63.6

[56] References Cited

U.S. PATENT DOCUMENTS

| 4,084,604 | 4/1978 | Budecker | 137/118 X |
| 4,130,127 | 12/1979 | Budecker | 137/118 X |
| 4,436,279 | 3/1984 | Bonds | 251/63.6 X |
| 4,634,099 | 1/1987 | Danko | 251/63.6 X |

FOREIGN PATENT DOCUMENTS

| 1600791 | 5/1970 | Fed. Rep. of Germany. |
| 2206001 | 8/1973 | Fed. Rep. of Germany. |
| 2338782 | 10/1976 | Fed. Rep. of Germany. |
| 2625555 | 12/1977 | Fed. Rep. of Germany. |
| 2624844 | 8/1982 | Fed. Rep. of Germany. |
| 2236484 | 2/1984 | Fed. Rep. of Germany. |
| 618425 | 2/1949 | United Kingdom. |
| 1079030 | 8/1967 | United Kingdom. |
| 1403483 | 8/1975 | United Kingdom. |
| 1545071 | 5/1979 | United Kingdom. |
| 2007403 | 5/1979 | United Kingdom. |
| 2038432 | 7/1979 | United Kingdom. |
| 2023883 | 1/1990 | United Kingdom. |

Primary Examiner—Alan Cohan
Attorney, Agent, or Firm—Robert P. Seitter; J. Gordon Lewis

[57] ABSTRACT

An accumulator loading valve is provided which is adapted for elevated pressures, which requires but little space, and which has a pump connection (1), a reservoir connection (20), a priority valve (7) between the consumer connection and the accumulator connection, and a pilot valve (4) being controlled by the accumulator pressure. The improvement is that the operating piston of the two-position pilot valve (4) is prestressed by a spring (28) having a constant spring rate and that the cross section of the valve inlet (19) is smaller than the cross section of the valve discharge (20).

9 Claims, 1 Drawing Sheet

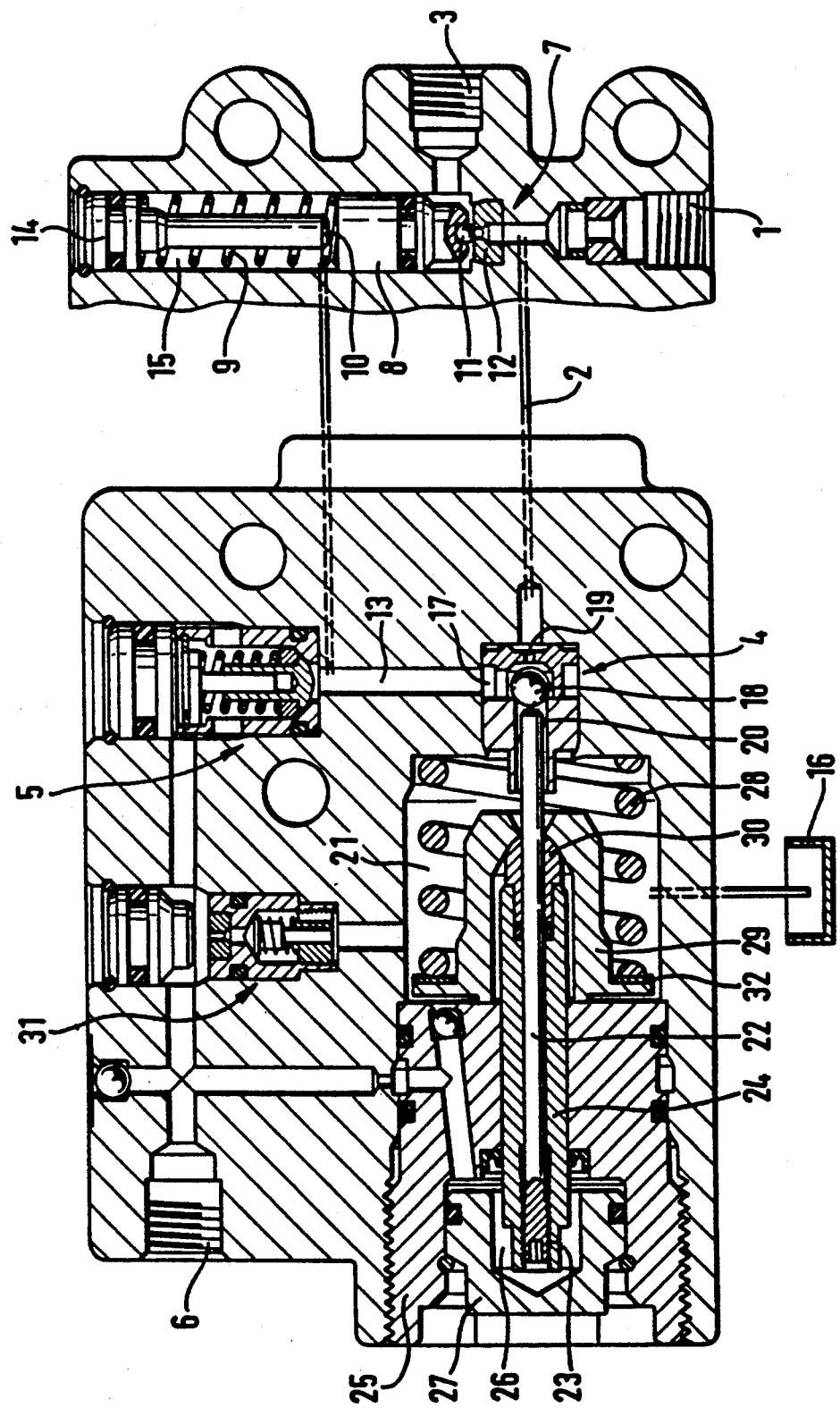

5,209,255

ACCUMULATOR LOADING VALVE

TECHNICAL FIELD

The present invention is related to an accumulator loading valve.

BACKGROUND OF THE INVENTION

An accumulator loading valve of this kind is known from the German patent application published without examination, No. 2,625,555. The two-position pilot valve disclosed there is furnished with an operating piston which is prestressed by a cup spring featuring a diminishing characteristic. This feature alone allows a sudden switch-over between the two potential switching positions. The rapid switch-over of the pilot valve is important for the whole accumulator loading valve since in an undefined intermediate position the accumulator loading function cannot be safeguarded. Cup springs of this kind, with a diminishing characteristic in order to fulfill their function, have a large diameter and, consequently, require a comparatively large housing. Thus, they can reasonably be employed exclusively in hydro-accumulators whose working pressure falls within a medium pressure range (approximately 50 to 60 bar).

SUMMARY OF THE INVENTION

It is, therefore, the object of the invention to create a reliably functioning accumulator loading valve which is adapted for accumulators featuring very high working pressures (200 bar and over) and which is distinguished by minimal space requirements.

This object is achieved by providing a space-saving helical spring. The rapid change-over characteristic (hysteresis) of the pilot valve, functionally vital, is achieved by the elimination due to switching of a surface undergoing the loading pressure. As a result of the elevated working pressure of the accumulator and of the correspondingly elevated loading pressure, an increased force differential occurs on the spring system of the operating piston even in a pilot valve featuring small mounting space requirements and having only a small hydraulically active sealing area. The increased force differential makes the pilot valve jump into its second switching position when the accumulator connection is connected to the reservoir for the first time. An exact adjustment of the pilot valve is rendered possible in that the operating piston is furnished with an actuating push rod which is screwed into the operating piston in a length-adjustable manner by a finely adjusting thread.

The operating piston undergoes the action of the spring element through an intermediate member being swingably supported at the operating piston, in order to keep the operating piston free of transverse forces. It is of particular advantage, in view of its use in the presence of elevated working pressures, that the valve device between the consumer connection and the accumulator connection is configured in the shape of a priority valve which shuts the consumer completely off from the pump connection in the event of failure to achieve a pre-established accumulator pressure. A particularly rapid switch-over of the valve device between the consumer connection and the accumulator connection is attained when the priority valve is controlled by an operating piston which undergoes the pressure in the pump connection, on one hand, and the pressure in the section between the pilot valve and the non-return valve preceding the accumulator, on the other hand, and, in addition, the force of a spring element. The capability of a rapid switch-over is fostered by a low-friction seal of the control piston. The control piston is provided with a circular groove in which a sealing ring is inserted whose internal diameter is slightly larger than the diameter of the groove bottom. Thanks to this floatingly incorporated sealing ring, no additional frictional forces will come about in the event of elevated pressures acting from either side.

Further advantageous features and the mode of operation of the present invention will be revealed by the following description of one embodiment, made with reference to the accompanying drawing.

BRIEF DESCRIPTION OF THE DRAWING

The only Figure shows a valve housing in which all of the individual elements of the accumulator loading valve are integrated. The priority valve is illustrated separately int he interest of clarity.

DETAILED DESCRIPTION OF THE INVENTION

The accumulator loading valve is furnished with a pump connection 1 leading to a transfer pump not shown in the drawing. From pump connection 1, an accumulator connection 2 and a consumer connection 3 branch off, which latter leads to a hydraulic power-assisted steering assembly for an automotive vehicle not shown in the drawing. The accumulator connection 2 leads through the pilot valve 4 and the non-return valve 5 to the outlet 6 which is linked to an accumulator of a hydraulic brake system. Between the accumulator connection 2 and the consumer connection 3, a priority valve designed in the shape of a ball-seat valve 7 is arranged. Valve 7 includes a control piston 8 which projects into the consumer connection 3 and in which the ball-shaped closing member 11 is integrated. Control piston 8 is sealed off with respect to the housing by a floatingly mounted 0-ring. The priority valve 7 is prestressed in the direction of the valve seat disposed between the accumulator connection and the consumer connection by the compression spring 9 which engages the operating piston 8. Compression spring 9 radially surrounds an axial extension of a closing element 14 which is sealingly fixed within the housing and defines a chamber 15. The end of the axial extension projecting into chamber 15 serves as a stop 10 for the control piston 8 when the priority valve 7 is open. Chamber 15 is linked to the section 13 of the accumulator connection 2 positioned between the pilot valve 4 and the non-return valve 5.

Pilot valve 4 is furnished with a valve housing within which a valve chamber 17 is configurated which accommodates the valve closing member being configurated in the shape of a ball 18 and which is permanently connected to section 13. From valve chamber 17, the valve inlet 19, which is part of the accumulator connection 2, leads to the pump connection 1. A discharge bore 20 leads from the valve chamber 17 into the chamber 21 which is linked to the reservoir 16. Valve seats, against which the ball 18 is sealingly abuttable, are configurated near the mouth of the valve inlet 19 and of the discharge bore 2 into the valve chamber 17.

The ball 18 is adapted to undergo the action of an actuating push rod 22 which is screwed into the operating piston 24 so that its length can be adjusted by a thread 23 having a low pitch. Operating piston 24 is sealedly guided in the insert 25 which defines a chamber 26 jointly with a closing element 27 which is rigidly coupled to it. Chamber 26, into which the end of the operating piston 24 facing away from the pilot valve 4 projects, is linked to the accumulator connection 2 through ducts in the insert 25 and in the housing in the area between the non-return valve 5 and the outlet 6, so that the accumulator pressure always prevails in chamber 26.

The operating piston 24 is elastically prestressed by the cylindrical helical spring 28 opposing the force resulting from the accumulator pressure. For this purpose, helical spring 28 takes support at the housing, on one side, and at the intermediate member 29 on the other side. Because of its cup-shaped configuration, member 29 partly surrounds operating piston 24 and is coupled to operating piston 24 through the calotte-shaped bearing 30 in a spherical joint. Owing to this jointed linkage, any transverse forces which result from manufacturing inaccuracies of the spring 28, which could result in jamming of the operating piston 24 within the insert 25, will be balanced. When the accumulator pressure is low or is absent, then under the prestressing action of the helical spring 28, the intermediate member 29 will abut a stop which is rigid with the housing. In this operating condition, the actuating push rod 22 projecting into the discharge bore 20 with a radial play is at a slight distance from the ball 18 closing discharge bore 20. The diameter of the discharge bore 20 is clearly larger than the diameter of the valve inlet 19. When the transfer pump starts while the accumulator is in the unloaded condition, then hydraulic fluid will be conveyed through the pump connection 1 into the accumulator connection 2, since the priority valve 7 interrupts the connection going from the pump connection 1 to the consumer connection 3. The operating piston 24 will be in the position shown in the drawing, as a result whereof the ball 18 will close the discharge bore 20. The connection between the valve inlet 19 and the section 13 is open, so that the accumulator will be loaded through the non-return valve 5.

Since the accumulator pressure stresses the operating piston 24 opposing the prestressing force of the helical spring 28, piston 24 will slide toward the pilot valve 4 as soon as a pre-established pressure threshold has been overcome. As the accumulator pressure rises, the actuating push rod 22 will for the first time abut against the ball 18 upon having overcome an idle travel distance. If and when the accumulator pressure rises to such a degree that the hydraulic power acting on the operating piston 24 can overcome the force with which the ball 18 is urged against the valve seat associated with the discharge bore 20 due to the pressure in the valve chamber 17, then the ball 18 will lift off the discharge bore 20 and will connect the valve chamber 17 and the section 13 for the first time to the chamber 21 and, thus, to the reservoir 16. Because the pressure in the valve chamber 17 will drop at that very moment, the force component will be cancelled which had counteracted the slide of the operating piston 24 into the chamber 21 by the action of the ball 18 which was subject to the pressure. As a result, the pilot valve 4 will all of a sudden switch into its second switching position, in which the valve inlet 19 is closed by the ball 18 being loaded by the operating piston. In this switching position, the force acting on the ball 18 which results from the pump pressure is clearly lower because the cross section of the valve inlet 19 is several times smaller than the cross section of the discharge bore 20.

In the operating condition which now exists, the chamber 15 is connected to the reservoir 16, as a result whereof the pressure in the pump connection 1 will open the priority valve 7 and hydraulic fluid will now be delivered into the consumer connection 3. When the accumulator pressure decreases again, the helical spring 28 will urge the operating piston 24 into the chamber 26, the pressure in the pump connection 1 will shift the ball 18 out of its abutment at the valve inlet into a position in which it again shuts off the discharge bore 20, the chamber 15 will be pressurized again, and the compression spring 9 will again close the priority valve 7, so that the loading procedure will repeat as described above. A pressure limiting valve 31 is provided which is positioned between the non-return valve 5 and the outlet 6 in order to protect the accumulator from being destroyed by overloading.

The prestressing force of the helical spring 28 is adjustable by inserting shim plates 32 between the helical spring and the circumferential collar of the intermediate member 29 at which it takes support. Upon adjustment of the prestressing force and upon mounting the operating piston 24, the intermediate member 29, and the helical spring 28 by screwing in the insert 25, the idle travel distance between the actuating push rod 22 and the ball 18 is adjusted. The operating piston 24 is for this purpose urged with a defined force in the direction of the pilot valve 4. A compressed air source with a pre-established maximum pressure is connected to the pump connection 1. The actuating push rod 22 is screwed by the thread 23 in the direction of the pilot valve 4 until the valve inlet is closed for the first time. Subsequently, the force which acts on the operating piston 24 is cancelled and the actuating push rod 22 is turned by a determined angle depending on the pitch of the thread 23 in the direction in which it shifts toward the chamber 26. Subsequently, the closing element 27 is mounted.

What is claimed is:

1. A pressure-responsive accumulator loading valve for distributing fluid under pressure delivered by a pump connection to a consumer through a consumer connection and to an accumulator through an accumulator connection, respectively, said accumulator loading valve comprising:
   a reservoir connection;
   pilot valve means including:
   (a) a valve having an inlet opening to said accumulator connection with a first flow cross-section and a discharge bore opening to said reservoir connection with a second flow cross-section which is larger than said first flow cross-section,
   (b) an operating piston,
   (c) a closing member actuated by said operating piston and adapted to open and close said valve inlet opening and said valve discharge bore opening, and
   (d) a space-saving helical spring element having a constant spring rate for elastically prestressing said operating piston,
   said pilot valve means adapted to respond to the pressure in said accumulator and having:
   (e) a first position in which said closing member closes said discharge bore opening to prevent communication between said reservoir connection and said accumulator connection and opens said inlet opening to allow communication between said pump connection and said accumulator through said accumulator connection when the pressure in said accumulator is below a predetermined switching pressure, and
(f) a second position in which said closing member opens said discharge bore opening to allow communication between said reservoir connection and said accumulator connection and closed said inlet opening to prevent communication between said pump connection and said accumulator through said accumulator connection when the pressure in said accumulator reaches said predetermined switching pressure; and priority valve means disposed between said pump connection and said consumer connection responsive to the pressure in said accumulator.

2. An accumulator loading valve as claimed in claim 1 wherein said operating piston has an actuating push rod adjustable in length.

3. An accumulator loading valve as claimed in claim 1 wherein said pilot valve means further comprises an intermediate member swivelably coupled to said operating piston and transmitting the force of said spring element to said operating piston.

4. An accumulator loading valve as claimed in claim 1 wherein said inlet opening of said valve of said pilot valve means is permanently connected to said pump connection through said accumulator connection.

5. An accumulator loading valve as claimed in claim 1 further comprising a non-return valve disposed in said accumulator connection between said pilot valve means and said accumulator.

6. An accumulator loading valve as claimed in claim 1 wherein said priority valve means includes a priority valve switching between a first position wherein said pump connection is open to said consumer connection, when the pressure in said accumulator reaches said predetermined switching pressure, and a second position wherein said pump connection is closed to said consumer connection when the pressure in said accumulator is below said predetermined switching pressure.

7. An accumulator loading valve as claimed in claim 6 wherein said priority valve means further includes a compression spring responsive to the amount of pressure in said accumulator connection and a control piston urged in one direction by said compression spring and in the opposite direction by the amount of pressure in said pump connection, said control piston switching said priority valve between said first position and said second position of said priority valve.

8. An accumulator loading valve as claimed in claim 7 wherein said priority valve means further includes a sealing ring engaging a circular groove in said control piston for sealing said control piston and having an internal diameter slightly larger than the diameter of the bottom of said circular groove.

9. An accumulator loading valve as claimed in claim 6 wherein said priority valve is a ball-seat valve.

* * * * *